US009409093B2

(12) United States Patent
Gadda et al.

(10) Patent No.: US 9,409,093 B2
(45) Date of Patent: Aug. 9, 2016

(54) GAMING DEVICE WITH MODULAR GAMING TABLE COMPONENTS

(71) Applicant: IGT, Las Vegas, NV (US)

(72) Inventors: Christian E. Gadda, Las Vegas, NV (US); Harold E. Mattice, Gardnerville, NV (US); Richard L. Wilder, Sparks, NV (US); Chauncey Griswold, Reno, NV (US); James W. Stockdale, Clio, CA (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 14/823,731

(22) Filed: Aug. 11, 2015

(65) Prior Publication Data

US 2015/0343315 A1    Dec. 3, 2015

Related U.S. Application Data

(63) Continuation of application No. 11/844,550, filed on Aug. 24, 2007, now Pat. No. 9,135,772.

(51) Int. Cl.
*G07F 17/00* (2006.01)
*A63F 13/90* (2014.01)
*G07F 17/32* (2006.01)

(52) U.S. Cl.
CPC ............... *A63F 13/90* (2014.09); *G07F 17/32* (2013.01); *G07F 17/322* (2013.01)

(58) Field of Classification Search
CPC .................................. A63F 13/12; A63F 13/10
See application file for complete search history.

(56) References Cited

U.S. PATENT DOCUMENTS

| | | |
|---|---|---|
| 3,352,615 A | 11/1967 | Sandin |
| 4,614,342 A | 9/1986 | Takashima |
| 4,641,378 A | 2/1987 | McConnell et al. |
| 5,393,057 A | 2/1995 | Mamell, II |
| 5,443,017 A | 8/1995 | Wacker et al. |
| 5,775,993 A | 7/1998 | Fentz et al. |
| 2002/0113751 A1 | 8/2002 | Knopf |
| 2003/0216185 A1 | 11/2003 | Varley |
| 2005/0288100 A1 | 12/2005 | Neervoort et al. |
| 2006/0046823 A1 | 3/2006 | Kaminkow et al. |

(Continued)

OTHER PUBLICATIONS

Extended Europan search report for co-pending EP patent application No. EP 08797819 (8 pgs.).

(Continued)

*Primary Examiner* — Reginald Renwick
(74) *Attorney, Agent, or Firm* — Neal, Gerber & Eisenberg LLP

(57) ABSTRACT

Provided in embodiments of the present invention is a gaming device having a plurality of dynamically connectable modular gaming table components that provide a variety of configuration options. In one example embodiment, the gaming device includes a first modular gaming table component and a second modular gaming table component, where the first modular gaming table component and second modular gaming table component are 10 connectable in a variety of arrangements. Each of the first and second modular gaming table components may include at least one gaming station having a gaming display, gaming control circuitry, structural connection means, and communication connection means, whereby the structural and communication connection means of the two components may be dynamically connectable in a variety of component arrangements.

22 Claims, 12 Drawing Sheets

(56) References Cited

U.S. PATENT DOCUMENTS

2006/0154711 A1\* 7/2006 Ellis ................... A63F 13/10
463/1
2007/0155465 A1 7/2007 Walker et al.

OTHER PUBLICATIONS

European Office Action for European Patent application No. 08 797 819.3 based on PCT/US2008073060 dated Feb. 12, 2016.

\* cited by examiner

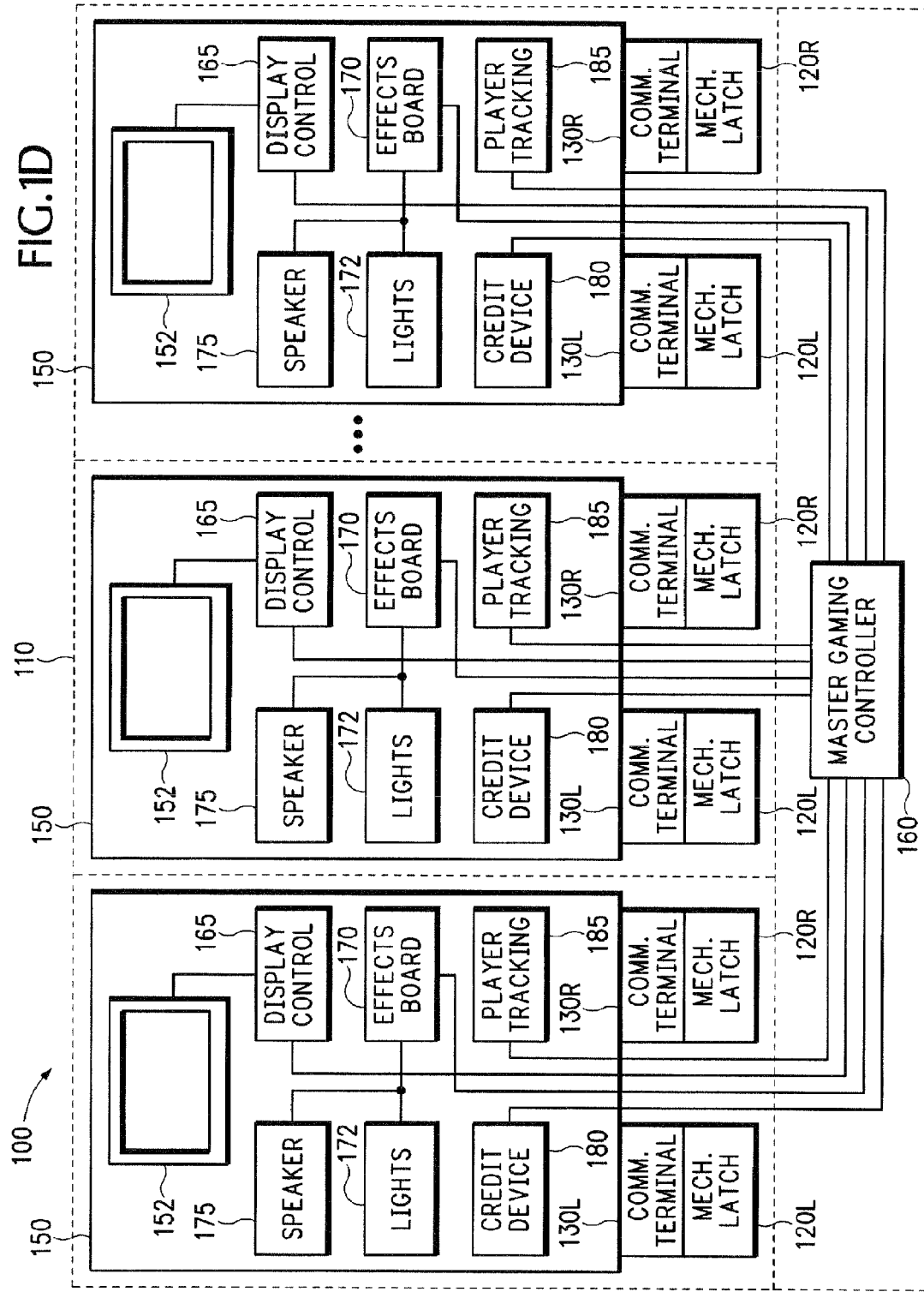

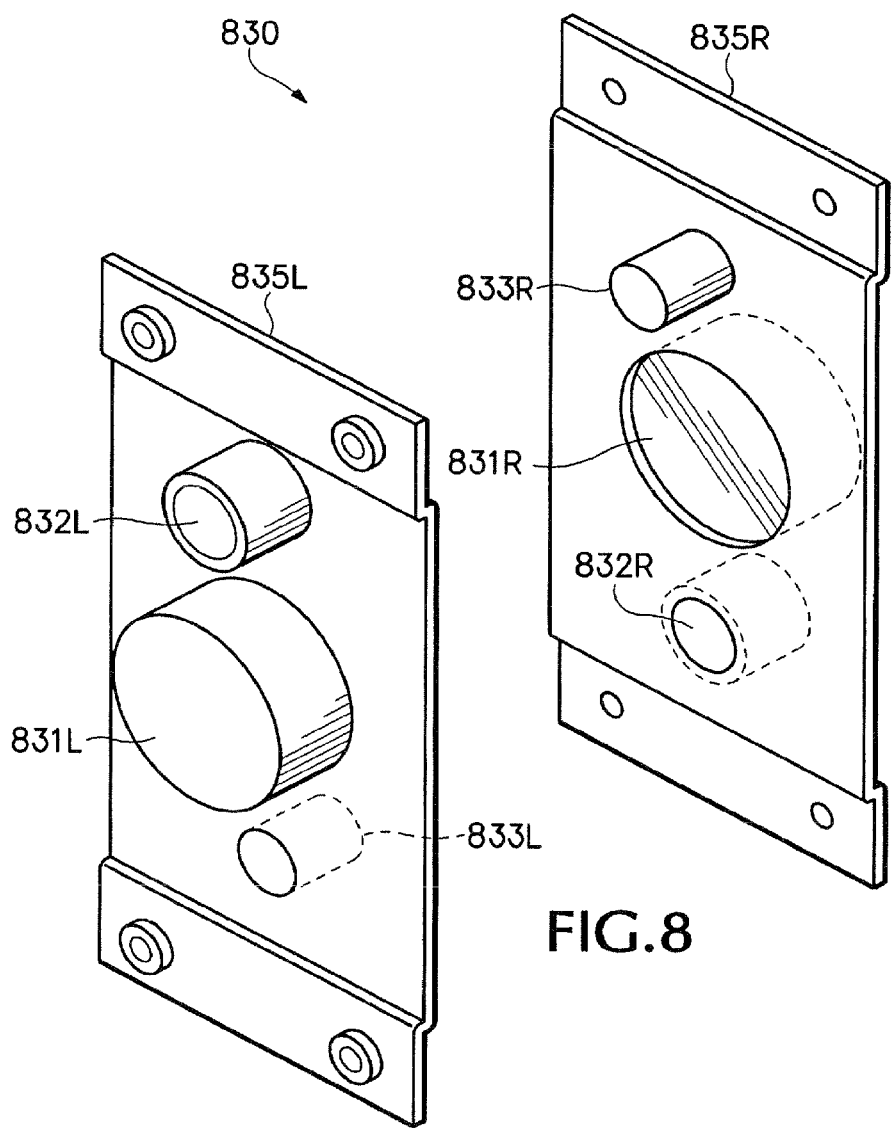

GAMING DEVICE WITH MODULAR GAMING TABLE COMPONENTS

PRIORITY CLAIM

This application is a continuation of, claims priority to and the benefit of U.S. patent application Ser. No. 11/844,550, filed on Aug. 24, 2007, the entire contents of each are incorporated herein by reference.

FIELD OF THE INVENTION

The present invention relates generally to a gaming device with modular gaming stations, and more particularly to an electronic gaming device having dynamically connectable modular gaming stations that provide a variety of configuration options for the gaming device.

Although gaming has existed in some form for many years, its present familiar form of slot devices, table games, sports books, etc. has mainly developed in the last few decades. Multiplayer gaming devices including multiplayer gaming tables have become popular in recent years because they allow more gaming devices to be fit into a specific area as well as providing a mechanism to allow for innovative gaming systems and styles. For example, electronic versions of poker, blackjack, craps, and others can be implemented on a multiplayer device to provide faster play and more consistent dealer mechanics. In some of these examples, a virtual dealer is displayed on a central screen to perform actions similar to what a live dealer would in running the games, such as shuffling or dealing the cards.

Other types of conventional multiplayer gaming devices include plurality of individual games that are configured to be respectively played at a plurality of gaming stations within a singular device body. For example, a plurality of video poker games may be housed in a semi-circular multiplayer gaming table with a separate display monitor associated with each of the individual gaming stations. These examples may include bar machines where multiple machines are included in a singular device.

However, while large multiplayer devices may help save floor space by allowing players to play in a more compact area that what would be feasible with separate machines, the large multiplayer devices can be difficult to orient in gaming areas that have physical restrictions or limitations. Even in relatively large gaming spaces, multiple multiplayer devices may be difficult to efficiently position relative to each other to maximize playable stations in a set area. In addition, the conventional large multiplayer gaming devices are generally very heavy and cumbersome to reposition. Thus, they may be difficult to reposition during gaming floor rearrangements. Also, these large multiplayer devices generally have a set number of gaming stations that cannot be altered. That is, if more or fewer gaming stations are desired in a specific gaming area it may be difficult to realize a desired configuration because of the set number of gaming stations generally associated with each multiplayer gaming device. While custom multiplayer tables are an option for some desired configurations, the cost of manufacturing them can be prohibitive because the structure of the housing or cabinet varies somewhat from the standard production models.

Further, if the multiplayer gaming devices need to be connected to one or more other gaming devices or a gaming network, all of the gaming devices in the connection usually have to be powered down and rebooted after the connection has been made. This sequence of powering down and rebooting (i.e., downtime) can take away from valuable gaming time.

These and other problems in conventional gaming devices are addressed by embodiments of the present invention.

SUMMARY

Embodiments of the present invention provide an electronic gaming device having a plurality of dynamically connectable modular gaming table components that provide a variety of configuration options. In one embodiment, a gaming device includes a first modular gaming table component and a second modular gaming table component, where the first modular gaming table component and second modular gaming table component are connectable in a variety of arrangements. The first modular gaming table component may include at least one gaming station having a gaming display, first gaming control circuitry, a first structural connection means, and a first communication connection means. Similarly, the second modular gaming table component may include at least one gaming station having a gaming display, second gaming control circuitry, a second structural connection means, and a second communication connection means. For connecting the first modular gaming table component to the second modular gaming table component, the first structural connection means and first communication connection means may be configured to respectively connect to the second structural connection means and second communication means.

BRIEF DESCRIPTION OF THE DRAWINGS

FIG. 1D illustrates a block diagram of the gaming device shown in FIG. 1A.

FIG. 8 illustrates an isometric view of a communication alignment device according to an embodiment of the present invention.

DETAILED DESCRIPTION

Figure 1A:
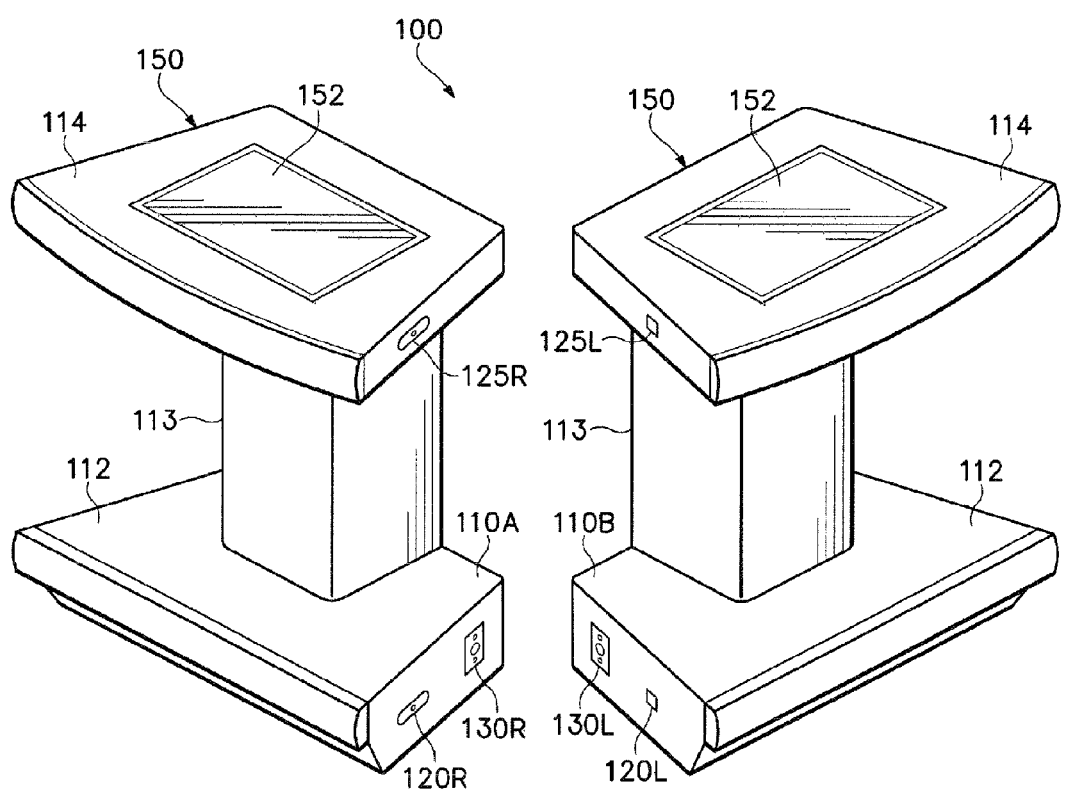
FIG. 1A illustrates an isometric view of a first and second modular gaming table component of a gaming device according to an embodiment of the present invention.

To address the problems discussed above and other problems, embodiments of the present invention are directed to an electronic gaming device having dynamically connectable modular gaming stations that provide a variety of configuration options. Some of these embodiments are described below in detail, and in addition, some specific details are shown for purposes of illustrating the inventive principles. However, numerous other arrangements may be devised in accordance \\rith the inventive principles of this patent disclosure. Thus, while the present invention is described in conjunction with the specific embodiments illustrated in the drawings, it is not limited to these embodiments or drawings. Rather, it is intended to cover alternatives, modifications, and equivalents that come within the scope and spirit of the inventive principles set out in the appended claims. Further, well known processes have not been described in detail in order not to obscure the present invention. Thus, the inventive principles are not limited to the specific details disclosed herein.

Figure 1B:
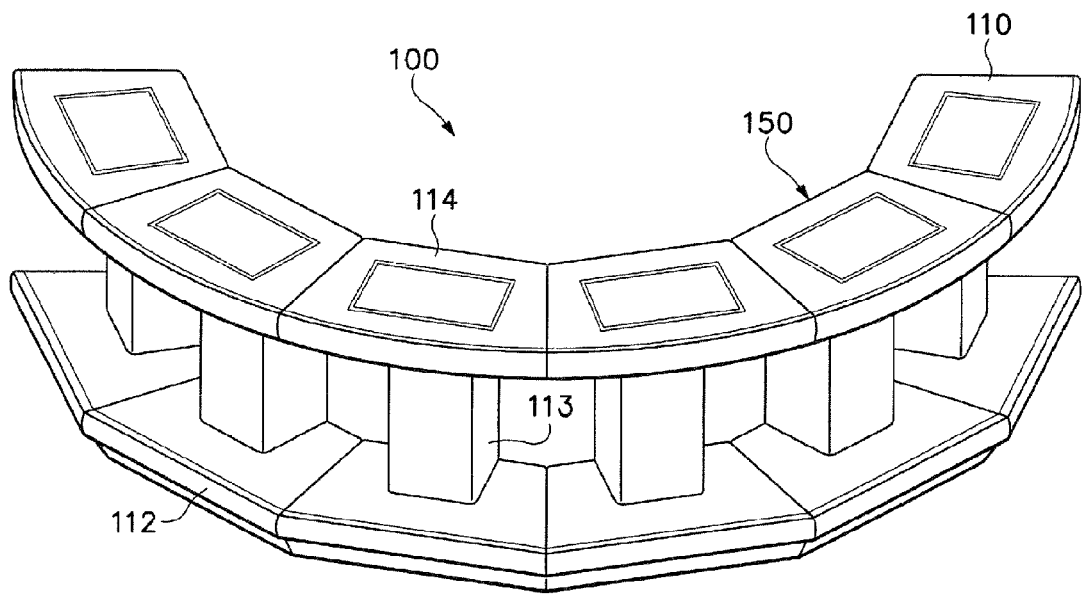
FIG. 1B illustrates an isometric view of the gaming device shown in FIG. 1A, where the gaming device has a plurality of connected modular gaming table components.
Figure 1C:
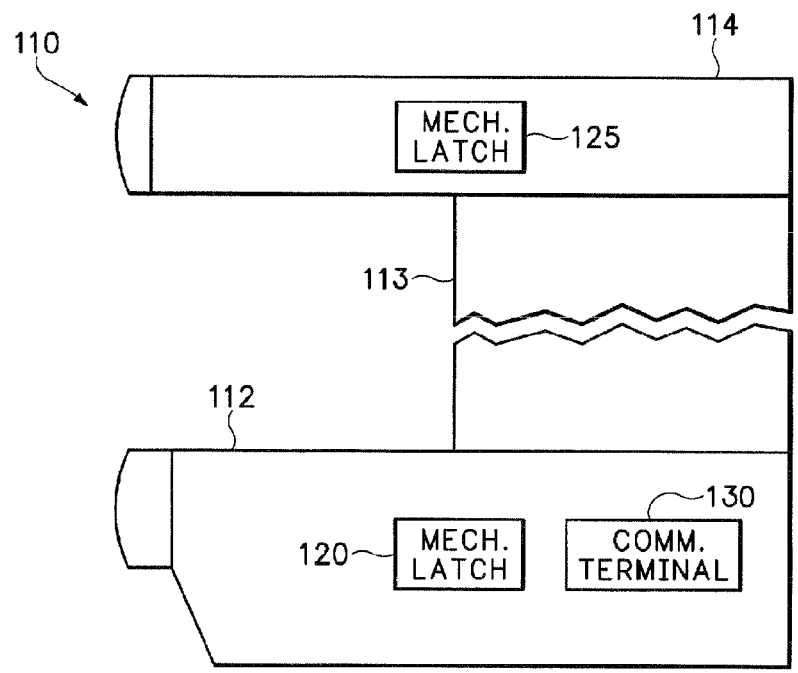
FIG. 1C illustrates a side view of a modular gaming table component shown in FIG. 1A.

FIGS. 1A-1D illustrate various views of gaming device having a plurality of modular gaming table components. FIG. 1A illustrates an isometric view of a first and second modular gaming table component of a gaming device according to an embodiment of the present invention. FIG. 1B illustrates an isometric view of the gaming device shown in FIG. 1A, where the gaming device has a plurality of connected modular gaming table components. FIG. 1C illustrates a side view of a modular gaming table component shown in FIG. 1A. FIG. 1D illustrates a block diagram of the gaming device shown in FIG. 1A.

Referring to FIGS. 1A-1D, a gaming device 100 includes a plurality of dynamically connectable modular gaming table components 110 (also referred to in the specification as gaming modules or modular components) that provide a variety of configuration options. That is, the modular gaming table components 110 may be connected to each other to form a gaming device 100 having a specific layout. For example, FIG. 1B illustrates an embodiment in which six modular gaming table components 110 are connected together to form a half circle shaped gaming device 100. Although FIG. 1B depicts an embodiment having six gaming modules 110, more or less modular components 110 are possible.

Figure 4A:
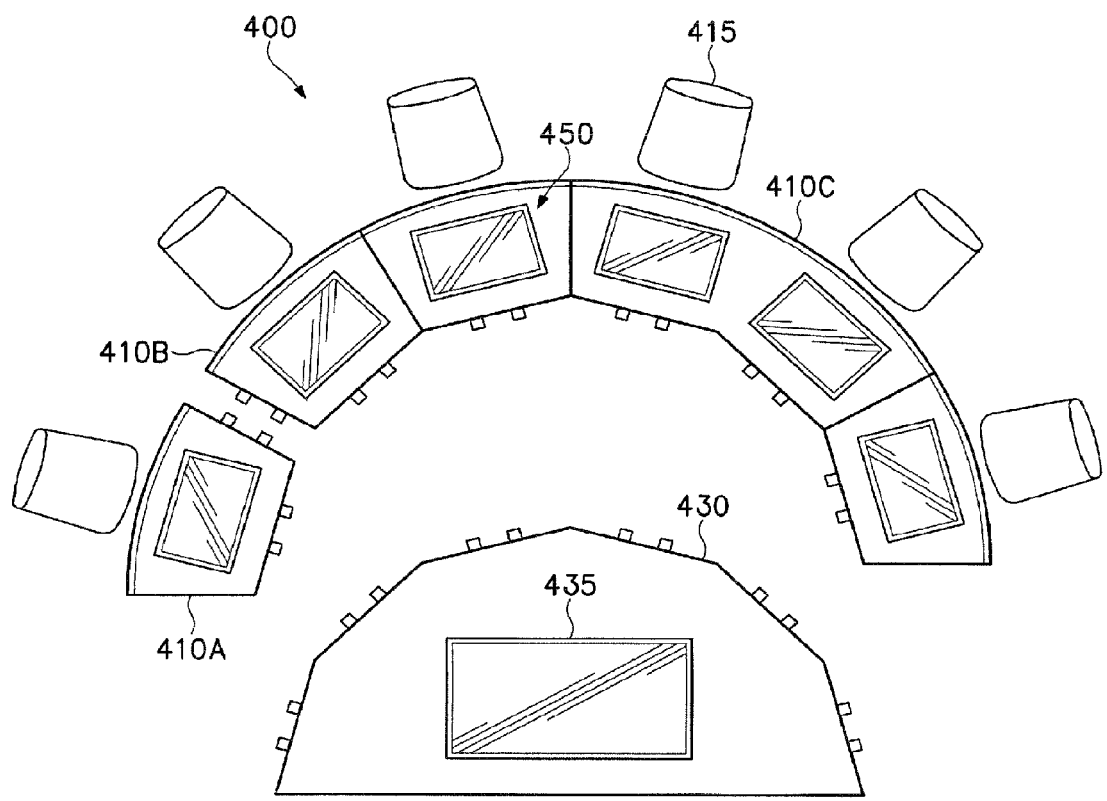
FIG. 4A illustrates a plan view of a gaming device according to another embodiment of the present invention.
Figure 4B:
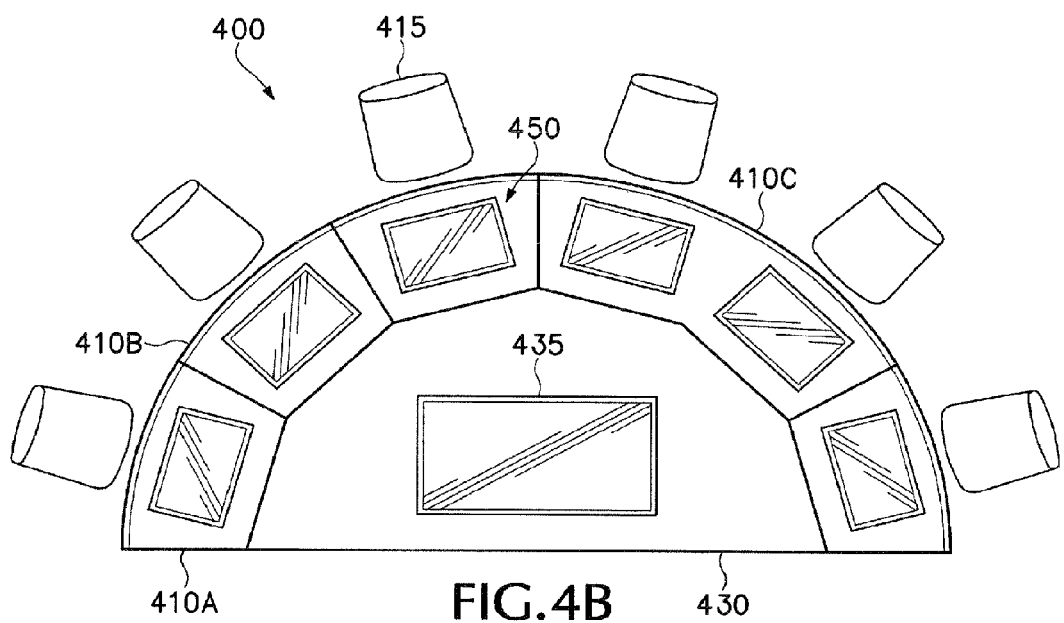
FIG. 4B illustrates another plan view of the gaming device shown in FIG. 4A.

Each modular gaming table component 110 may include one or more gaming stations 150 that are playable by a player. In FIGS. 1A and 1B each modular gaming table component 110 includes a single gaming station 150. However, in other embodiments, two or more gaming stations 150 may be included on a single modular component 110. For example, as illustrated in FIGS. 4A and 4B, modular gaming station 410C includes two gaming stations 150/450 within a single modular component. In some embodiments, six gaming stations 150 formed in a semi-circle similar to that of the gaming device 100 shown in FIG. 1B may be all formed in a single modular gaming table component 110 that may be connected to other modular gaming table components 110. Having multiple gaming stations 150 on a single 15 modular gaming table component 110 may be advantageous as main building block gaming modules in which single gaming station 150 gaming modules 110 can be connected thereto to alter the final arrangement of the gaming device 100. Having a main building block module with a plurality of gaming stations 150 may also be advantageous where a central community module is present, such as shown in FIGS. 4A-4C, 5, and 6.

This modular gaming device 100 has many advantages over conventional gaming tables. For example, the modular gaming table components 110 can be rearranged in a variety of configurations to strategically fit on irregularly shaped portions of a gaming floor in a casino. That is, portions of a casino gaming floor that traditionally may only be able to fit a single slot machine, a small bank of slot machines, or a custom designed gaming table may be able to use the modularity of the gaming device 100 described in embodiments of the present invention to customize the shape of the gaming table using mass produced modular gaming station components. This reduces the cost over a custom table setup which often times many more times expensive because the layout is not one typically made. Additionally, since each gaming station 150 of the gaming device 100 may be configured to play independent slot games, the gaming device 100 shown in embodiments of the present invention may still allow individual game play while also having the flexibility to be easily converted into a multiplayer virtual game, such as virtual poker or virtual blackjack, as well as allowing linked-gaming systems, such as those with a community bonus feature, to be realized.

Additionally, embodiments of the present invention may allow quick reconfiguration of gaming tables to facilitate tournament or promotional game play. Thus, instead of trying to link together existing gaming tables by extended networks and/or difficult physical movement of the devices, embodiments of the present invention allow individual modular gaming table components to be easily and quickly connected in a variety of arrangements. Although these connections can include physical connections with other modular components 110, the modular gaming table components may also be spaced apart and still quickly connected to one another 10 (such as in the embodiment shown in FIG. 6).

Further, since casinos are frequently changing gaming floor layouts to provide new games and arrangements for players, having easily moveable modular gaming components 110 makes moving a gaming device 100 much easier than moving a large awkward gaming table. Although not shown in the drawings, each modular gaming table component 110 may include a moving means such as wheels or castors to further aid in moving the gaming module 110. In some embodiments, these moving means may be locked so that the gaming modules are immovable once they are placed in a desired location. In other embodiments, stabilizer legs (now shown) may be lowered to fix the modular component 110 to a desired location. The easily moveable nature of these modular gaming table components 110 may also be advantageous for floor cleaning purposes, or other rearrangement needs, such as to clear space for other gaming devices or promotional prizes to be moved through that area of the gaming floor.

Referring again to FIGS. 1A-1D, each modular gaming table component 110 may include a base portion 112, and an upper portion 114, and a body portion 113 connecting the base portion 112 to the upper portion 114. In other embodiments, however, the base portion 112, body portion 113, and upper portion 114 may be integrated together in a single structure. Each modular gaming table component 110 further includes at least one mechanical connection means 120 and at least one communication connection means 130. In the embodiment shown in FIGS. 1A-1D, each modular gaming table component 110 includes a left lower mechanical connection means 120L, a right lower mechanical connection means 120R, a left upper mechanical connection means 125L, a right upper mechanical connection means 125R, a left communication connection means 130L, and a right communication means 130R. Although the lower and upper mechanical connection means 120, 125 are described using separate reference elements for the sake of clarity; they may be referred together elsewhere in the specification under the general mechanical connection means reference element 120. In this 5 embodiment, the left and right upper mechanical connection means 125L, 125R are respectively formed on the left and right side of the upper portion 114 of each of the modular gaming table components 110. The left and right lower mechanical connection means 120L, 120R are respectively formed on the left and right side of the lower portion 112 of the modular gaming table components. In addition, the left and right communication connection means 130L, 130R are respectively formed on the left and right side of the lower portion 112 of the modular gaming table components 110. However, in other embodiments there may be less or more mechanical connection means and communication connection means 120, 130. In addition, the location of these mechanical and communication connection means 120, 130 may vary in other embodiments.

The mechanical connection means 120 may include universal quick-release latches in a variety of configurations. One embodiment of these universal quick-release latches is described in additional detail below with reference to FIGS. 7A and 7B. However, other embodiments may include anyone of a variety of different mechanical connection means such as bolting connection structures, hook-and-loop fastening straps, buckles, lockable pins and pin receivers, and other mechanical connection means known in the art. It is advantageous having mechanical connection means 120 on at least a left and right side of a modular gaming table component 110 so that the modular gaming table component 110 can connect to at least two other modular gaming table components 110. Additional mechanical connection means for connecting to a community module (shown, for example, in FIGS. 4A and 4B) may also be desirable. Having more mechanical connection means 120 may improve the connection stability between two gaming modules 110, but may slow down the connection and disconnection process.

The communication connection means 130 may include an optical coupling device, such as the embodiment described below with respect to FIGS. 9A and 9B. However, other embodiments may include anyone of a variety of different communication means such as traditional signal cables (USB, firewire, etc.), Ethernet network cables, infrared (IR) transceivers/receivers, wireless ports, radio frequency (RF) communication means, and fiber optic light transmission/reception. Additionally, different communication means may be present on a single modular gaming table component 110. For example, a gaming module 110 may include a left and right IR optical transceiver/receiver for connecting and communicating with other gaming modules 110, but may also have a wireless port to communicate with a community portion (such as the one shown in FIGS. 4A and 4B) of the gaming device 100. Additional details of the communication means are discussed below with respect to FIGS. 8 and 9A-9B. In other embodiments, the communication connection means 130 may also be configured to transmit electrical power from one modular gaming table component 110 to another modular gaming table component 110. Since it is preferable for the modular gaming table components to be quickly connectable and disconnectable, an appropriate signal cable and connection means may be used to safely and efficiently transmit the electrical power. Although not shown, an additional separate power connection means may be included in each modular gaming table component 110 to transfer electrical power between the gaming modules 110 without the need for multiple power cords being plugged into multiple electrical outlets.

The upper structure 114 may be a tabletop style structure such as the substantially semicircular gaming device 100 illustrated in FIG. 1B. However, the upper structure may be formed in a variety of shapes and styles and is not limited to the structure shown in these embodiments. For example, although not pictured, the gaming device 100 may be part of a bar counter or dining table, where the modular gaming table components 110 are arranged to match the shape or function of these structures.

Referring again to FIGS. 1A-ID, each gaming station 150 of the gaming device 100 may include a gaming display 152, a player tracking input device 185, a credit input/output device 180, and other mechanical input devices (not shown) such as buttons. The player tracking device 185 may include a player tracking card reader, an electronic pad to read a chip imbedded in a player card or other player-identifying card, a biometric reader device, or any other device used to identify a player and track their game play information. The credit input/output device 180 may include a bill or ticket reader, a coin acceptor, a ticket printer, or other types of devices that allow a player to initiate, buy, or transfer credits to a machine as well as receive or cash-out credits back from the machine.

In addition, each gaming station 150 may include other output devices besides the gaming display 152, such as lights 172 and speakers 175 to attract players or emphasize wins. These peripheral devices may be controlled by an effects board 170 to coordinate lighting and sound dependent on a particular gaming situation or mode. In addition, the gaming display screen 152 may be controlled by a display control circuit 165.

The player tracking device 185, the credit input/output device 180, the effects board 170, the display control circuit 165, and other peripheral devices may be connected to and at least partially controlled by a master gaming controller 160. The master gaming controller 160 may further be connected to each of the gaming stations 150, and may therefore help control all of the gaming stations 150 on the gaming device 100. Although the master gaming controller 160 is illustrated as being located within the gaming device 110 in FIG. 1D, it may be located on a remote server and connected to the gaming stations 150 by means of a communication network (such as the one shown in FIG. 10) in other embodiments. However, in other embodiments, each modular gaming table component 110 or even each gaming station 150 may be connected to an individual game controller that is dedicated to that particular modular component 110 or game station 150. In some of these embodiments, the individual game controllers may be networked together within the gaming device 100 through the communication connection means 130 or may be similarly linked to a central server outside the gaming device 110.

Figure 2:
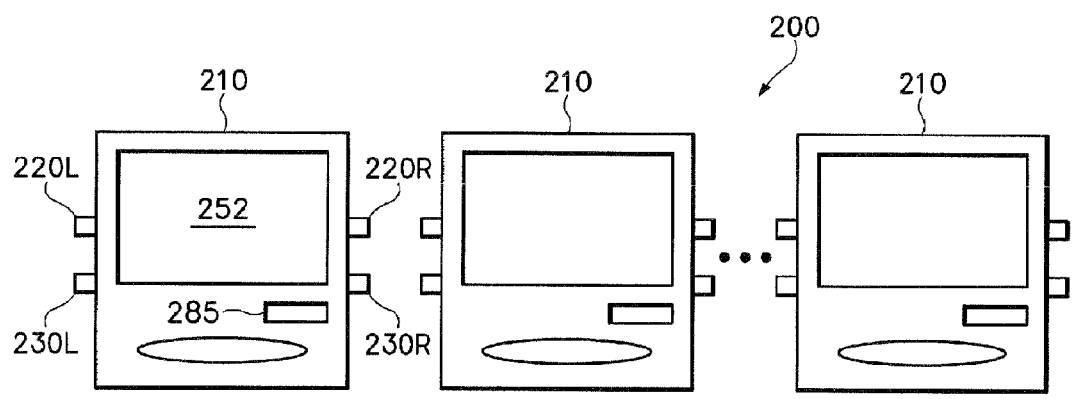
FIG. 2 illustrates a diagram of gaming device connection arrangement according to another embodiment of the present invention.

FIG. 2 illustrates a diagram of gaming device connection arrangement according to another embodiment of the present invention.

Referring to FIG. 2, a gaming device 200 includes a plurality of modular gaming table components 210 that are connectable in a variety of arrangements through right mechanical and communication connection means 220R, 230R, and left mechanical and communication connection means 220L, 230L. As previously discussed, each gaming module 210 may include a gaming display 252 and a player tracking interface device 285. As shown in FIG. 2, each gaming module 210 may be configured in a substantially rectangular shape to allow substantially linear connection schemes for the gaming device 200. These arrangements may be preferable in certain areas of the gaming floor such as where the gaming device 200 is a bar machine or where a large community screen (not shown) is mounted at a distance in front of the gaming device 200. For example, a linear array of the gaming modules 210 may be preferable in a sports book setting so that players can face the large sports screens, or in certain linked gaming systems.

Figure 3:
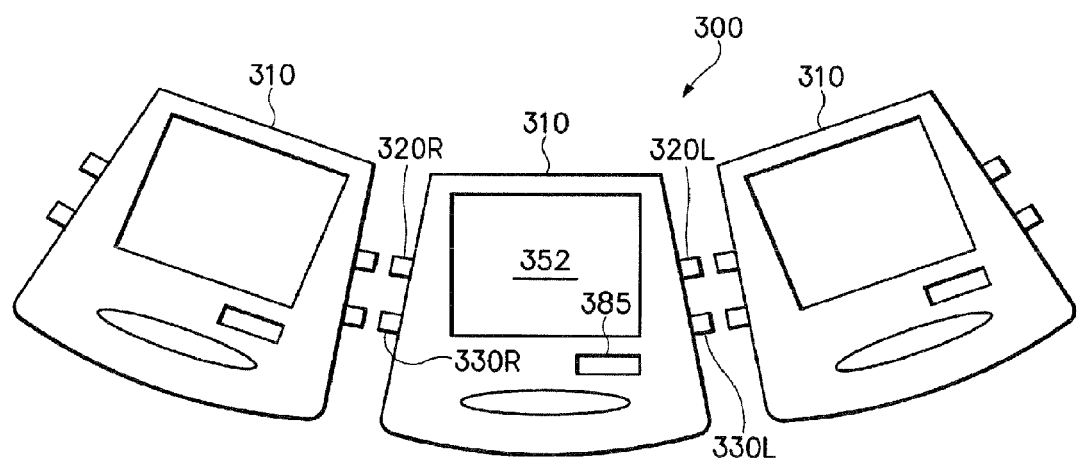
FIG. 3 illustrates a diagram of a gaming device connection arrangement according to yet another embodiment of the present invention.

FIG. 3 illustrates a diagram of a gaming device connection arrangement according to yet another embodiment of the present invention.

Referring to FIG. 3, a gaming device 300 includes a plurality of modular gaming table components 310 that are connectable in a variety of arrangements through right mechanical and communication connection means 320R, 330R, and left mechanical and communication connection means 320L, 330L. As previously discussed, each gaming module 310 may include a gaming display 352 and a player tracking interface device 385. As shown in FIG. 3, each gaming module 310 may be configured in a substantially trapezoidal shape to allow arcing or semicircular connection schemes for the gaming device 300. These arrangements may be preferable in certain areas of the gaming floor or in virtual table games such as virtual poker, virtual blackjack, or virtual roulette. This type of arrangement may be advantageous in that it allows each of the players to easily view a central community module (such as the one shown in FIGS. 4A-4C) of the gaming device 300, which may display a virtual dealers blackjack hand, community cards in Texas Hold 'em Poker, or a virtual roulette wheel. In addition, this type of configuration may be structured to resemble the recognizable conventional gaming tables from traditional black jack tables, to virtual smart gaming tables, thereby providing the player a level of familiarity.

Although not explicitly shown, the modular gaming table components 310 illustrated in FIG. 3 may be configured to be interchangeably shaped to have a substantially rectangular shape such as the modular gaming table components 210 illustrated in FIG. 2. In one embodiment, each of the modular gaming table components may have a removable or foldable edge sections that allows the modular gaming table components 310 to be shaped in either of the orientations depicted in FIGS. 2 and 3.

Figure 4C:
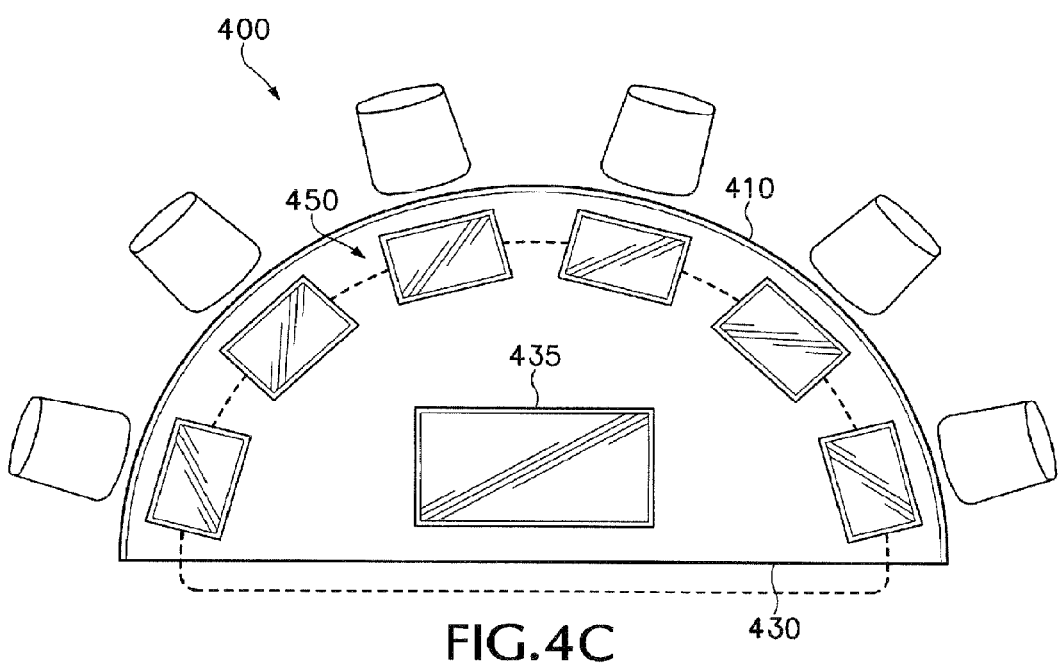
FIG. 4C illustrates another plan view of the gaming device shown in FIG. 4A.

FIGS. 4A-4C illustrate various plan views of a gaming device according to another embodiment of the present invention. FIG. 4A illustrates a first plan view of the gaming device according to this embodiment of the present invention. FIG. 4B illustrates another plan view of the gaming device shown in FIG. 4A. FIG. 4C illustrates yet another plan view of the gaming device shown in FIG. 4A.

Referring to FIGS. 4A and 4B, a gaming device 400 includes a plurality of modular gaming table components 410A, 410B, 410C and a community module 430. Each of the modular gaming table components includes at least one gaming station 450. For example, gaming modules 410A and 410B include a single gaming station 450, but gaming module 410C includes two gaming stations in the same gaming module. In other embodiments, additional gaming stations 450 may be included in a single modular gaming table component 410. The gaming device 400 also includes a plurality of chairs 415 for players to sit in while playing at a gaming station 450. Each chair 415 may be separate from the gaming module 410 or may be physically connected to the gaming module 410 as required in some gaming jurisdictions. The community module 430 may include a community display screen 435 that displays community information such as community cards in poker, dealer cards in blackjack, or a virtual roulette wheel. Additionally, the community display screen 435 may display community bonus data in linked-bonus gaming systems. In other embodiments, the community module 430 may include physical community devices such as physical roulette wheel, a Slotto® bin, or other physical device integrated into the game play or bonus of the gaming system of the gaming device 400.

The community module 430 may be connected to each of the gaming modules 410 as shown in FIGS. 4A-4C or may be connected to only one of the gaming modules 410, where it would communicate with the other gaming modules 410 through the connected gaming module 410 using the communication connection means (130 in FIG. 1 A) used between the gaming modules 410. In some embodiments, the communication connection means 130 between the gaming modules 410 may be removed, where all communication between the gaming modules 410 would occur through the community module 430. The community module 430 may be connected by both a mechanical connection means and communication connection means to the gaming modules 410. These connection means may be similar to those connection means between the gaming modules 410. In some embodiments, the community module may be remotely connected to the gaming modules 410 through, for example, a wireless connection. This type of arrangement may be preferable in embodiments of the gaming device 400 where the community display screen 435 is very large and/or mounted on a wall in front of the gaming modules 410.

Referring to FIG. 4C, each of the modular gaming table components 410 may be connected to a neighboring gaming module 410 in a ring like manner. The end gaming modules 410 may be directly connected to each other through a supplemental connection means (not shown) or connected to each other though the community module 430.

Figure 5:
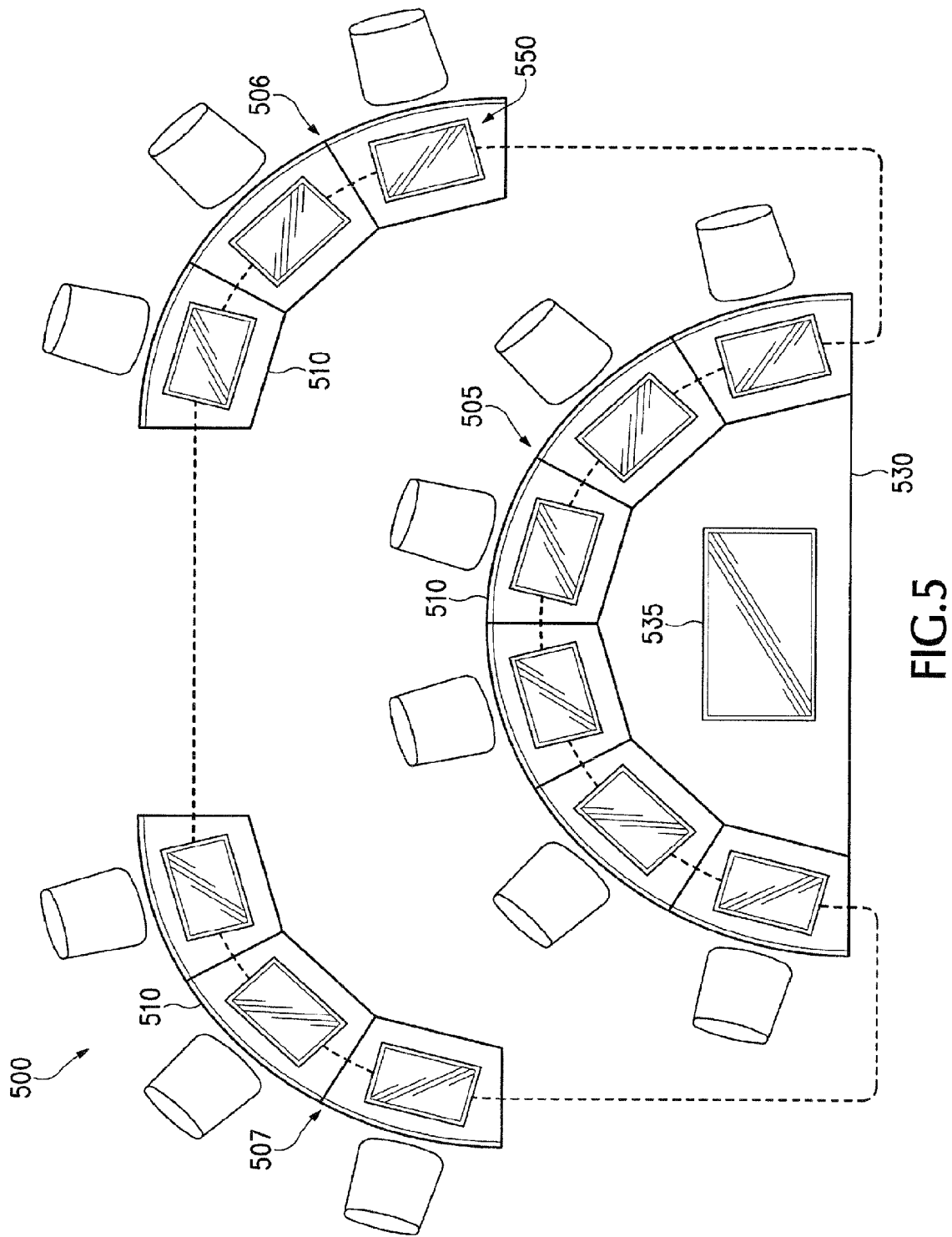
FIG. 5 illustrates a plan view of a gaming device according to still another embodiment of the present invention.

FIG. 5 illustrates a plan view of a gaming device according to still another embodiment of the present invention.

Referring to FIG. 5, a gaming device 500 includes a plurality of modular gaming table components 510 arranged in a stadium configuration. That is, a first plurality of gaming modules 510 are grouped together in a first table portion 505 connected to a community module 530 having a community display 535. A second plurality of gaming modules 510 are grouped together in a second table portion 506, which is physically separated from the first table portion 505. Additionally, a third plurality of gaming modules 510 are grouped together in a third table portion 507, which is physically separated from both the first table portion 505 and the second table portion 506. The second and third table portions 506, 507 may be located on floor space that is vertically higher than the floor space that the first table portion 505 is located so that players at the second and third table portions 506, 507 have a clear view of the community screen 535 of the community module 530. Additionally, although not shown, the community screen 535 may be mounted on a wall or other structure in front of all three table portions 505, 506, 507 to improve visibility and enhance the gaming experience. The second and third table portions 506, 507 may still be electrically connected with each other and the first table portion 505 to provide a communication route to each portion of the gaming device 500. In some embodiments, each of the first, second, and third table portions 505, 506, 507 may comprise a single gaming module 510 having a plurality of gaming stations 550. In other embodiments, various other arrangements of the gaming modules 510 and/or the table portions may be provided.

Figure 6:
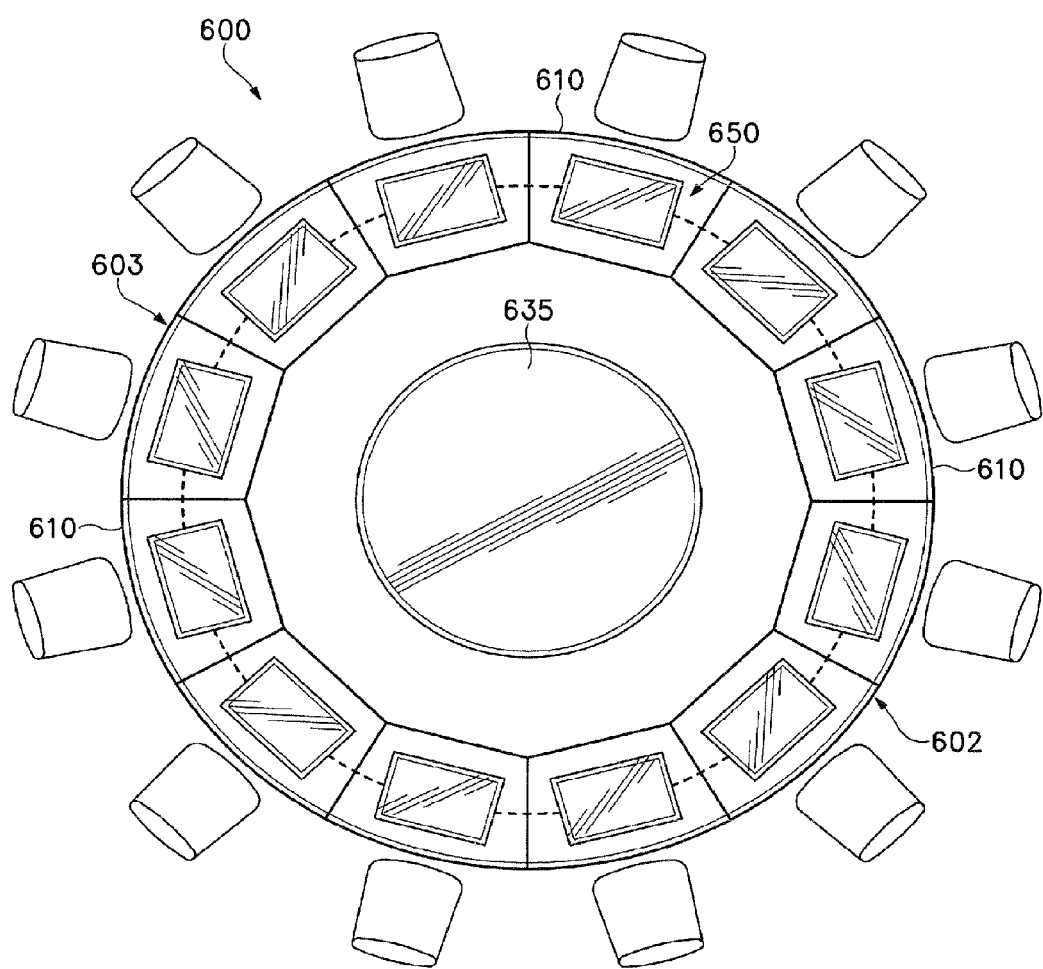
FIG. 6 illustrates a plan view of a gaming device according to still yet another embodiment of the present invention.

FIG. 6 illustrates a plan view of a gaming device according to still yet another embodiment of the present invention.

Referring to FIG. 6, a gaming device 600 includes a plurality of modular gaming table components 610 arranged in a circular shape. In the embodiment shown in FIG. 6, two module gaming table components 602, 603 each having six gaming stations 650 are shown connected to each other. However, in other embodiments twelve gaming modules 610 each having a single gaming station may be connected in the gaming device arrangement depicted in FIG. 6. The gaming device 600 also includes a community display 635 located in the center of the gaming device 600. This central community display 635 may include a domed shaped (i.e., convex) screen with one or more sunken rear projectors to display community information such as a virtual roulette wheel or virtual horse race. In other embodiments, the central community display may include a bowl-shaped (i.e., an inverted dome or concave) screen such that players view community information opposite the gaming station 650 that they are playing on. In still other embodiments, the central community display 635 may include a three-dimensional (3D) projected image.

Figure 7A:
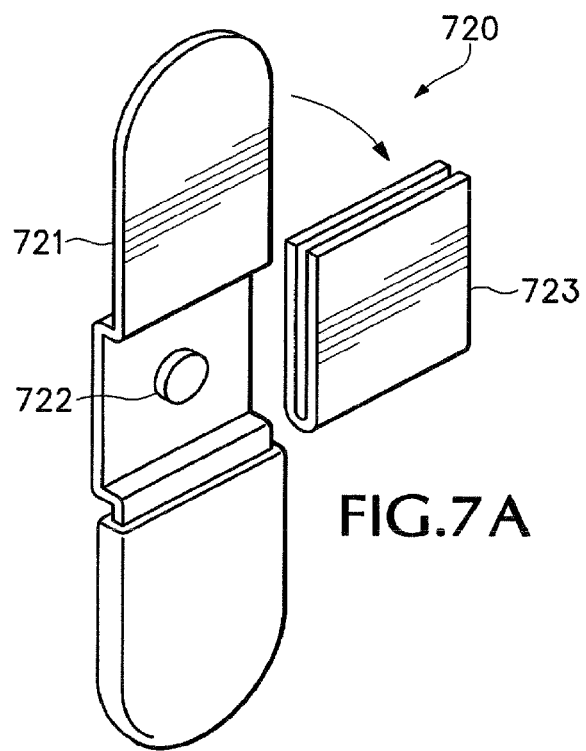
FIGS. 7A and 7B illustrate isometric views of a mechanical latching device according to an embodiment of the present invention.
Figure 7B:
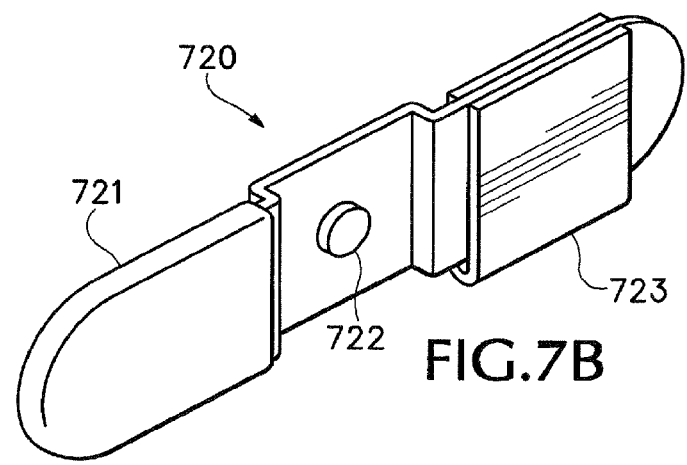

FIGS. 7A and 7B illustrate isometric views of a mechanical latching device according to an embodiment of the present invention.

Referring to FIGS. 7A and 7B, an exemplary mechanical connection means 720 is illustrated where the mechanical connection means 720 includes a universal quick-release mechanism. The mechanical connection means 720 includes a quick-release latch that is rotatable around a pin 722, and a knock-out opening 723 in the machine that includes a channel that is structured to receive a portion of the quick-release latch in one configuration. As shown in FIG. 7A, to disconnect the mechanical connection means 720, a portion of the quick-release latch 721 is depressed causing the latch 721 to rotate about the pin 722 freeing a portion of the latch 21 from the channel of the knock-out opening 723. Similarly, as shown in FIG. 7B, to connect the mechanical connection means 720, a portion of the quick-release latch 721 is raised after the gaming modules are properly aligned so that the latch 721 rotates about the pin 722 to engage the knock-out opening channel 723. However, as mentioned above, many various mechanical connection means 720 may be used to physically connect the modular gaming table components 110.

FIG. 8 illustrates an isometric view of a communication alignment device according to an embodiment of the present invention.

Referring to FIG. 8, a communication connection means 830 includes one side of a communication alignment device 835. Each of the communication alignment devices 835 may include a guide pin 833, guide pin receptacle 832, and a signal portion 831. Thus, in connecting the communication means of two modular gaming table components, a user would align a left communication alignment device 835L with a right communication alignment device 835R such that the right guide pin 833R of the right communication alignment device 835R is aligned with the left guide pin receptacle 832L of the left communication alignment device 835L and the left guide pin 833L of the left communication alignment device 835L is aligned with the right guide pin receptacle 832R of the right communication alignment device 835R. As these guide pins and guide pin receptacles are aligned, the left signal portion 831L of the left communication alignment device 835L is aligned with the right signal portion 831R of the right communication alignment device 835R.

This type of alignment device 835 may be preferable where the communication connection means 830 includes an IR optical connection means since a proper alignment between IR transistors improve signal strength and quality. However, in other embodiments that utilize wireless communication connection means, such an alignment device in not required.

Figure 9A:
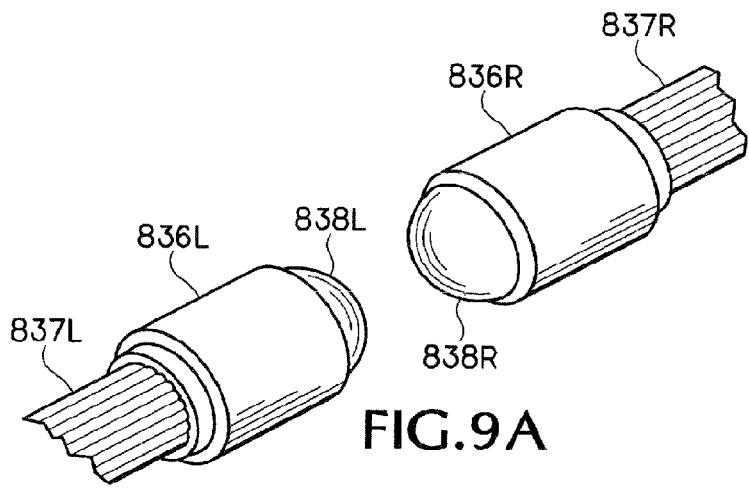
FIGS. 9A and 9B respectively illustrate an isometric view and a side view of a communication device according to an embodiment of the present invention.
Figure 9B:
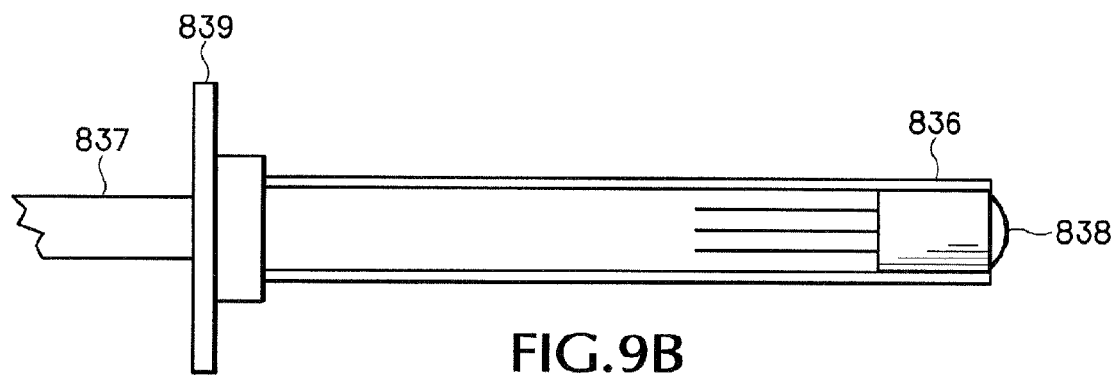

FIGS. 9A and 9B respectively illustrate an isometric view and a side view of a communication device according to an embodiment of the present invention.

Referring to FIGS. 9A and 9B, signal portions 831 of the communication connection means 830 shown in FIG. 8 may comprise an IR transceiver that includes an IR light emitting diode (LED) 836 connected to an IR transistor 838 through a fiber optic bundle 837. The LED 836 may include a fit plate 839 (shown in FIG. 9B) that allows the LED 836 to attach to the signal portion 831 of the communication alignment devices 835 shown in FIG. 8. This optic coupling transmits and receives IR signals to facilitate communication between the modular gaming table components 110 shown in FIGS. 1A-1D. One advantage of using an optic coupling is the ability to dynamically couple the gaming modules 110 together without having to reboot them. Further, as there are no physical connection restrictions between the communication connection means 830 it is faster to disconnect or connect the gaming modules 110 to one another. However, as described above, many various communication connection means may be used to set up a communication connection between the modular gaming table components 110.

Figure 10:
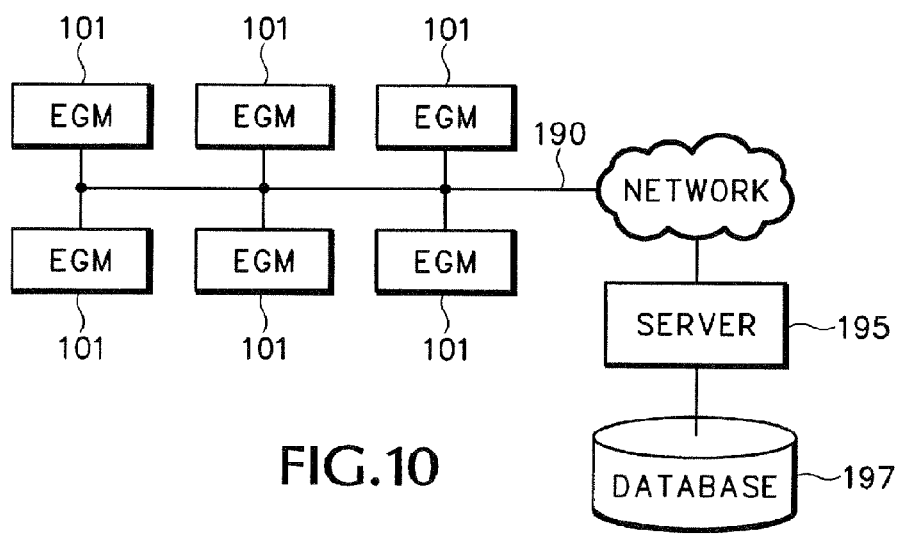
FIG. 10 illustrates a block diagram of networked gaming devices according to an embodiment of the present invention.

FIG. 10 illustrates a block diagram of networked gaming devices according to an embodiment of the present invention. Referring to FIG. 10, multiple electronic gaming devices (EGM) 101 may be connected together and connected to a remote server 195 via a network 190. Additionally, the gaming server 195 may be connected to one or more gaming databases 197. These gaming network 190 connections may allow multiple gaming devices 101 to remain in contact during particular gaming modes such as tournament play or remote head to head play. Although some of the gaming devices 101 connected on the gaming network 190 may resemble the gaming devices 100 shown in FIGS. 1A-1D, other connected gaming devices 101 may include traditional slot machines, wireless handheld gaming machines, cell phones, etc. Therefore, while some of the gaming devices 101 connected to the gaming network 190 may have multiple gaming stations, other gaming devices 101 connected to the same gaming network 190 may only have one gaming station.

As mentioned above, each modular gaming table component 110 (shown in FIGS. 1A-1D) of the gaming devices 100 may have individual game controllers or the modular gaming table components 110 may be connected together through a master gaming controller 160 (as shown in FIG. 1D) within a gaming device 101. Here, the individual game controllers and/or the multi-game controllers at a single gaming device 100 may be connected to a central server 195 based game controller for operation of a server based game such as BINGO or keno, where individual gaming stations 150 (shown in FIGS. 1A-1D) at the gaming devices 101 may act as gaming terminals.

In some embodiments, the network 190, server 195, and database 197 may be dedicated to communications regarding specific game or tournament play. However, in other embodiments, the network 190, server 195, and database 197 may be part of another existing system such as a player tracking network, server, and database. Additionally, a separate database 197 or server 195 may be connected to a common network 190 that can transmit both game/tournament data and player tracking data.

Figures 11, 12:
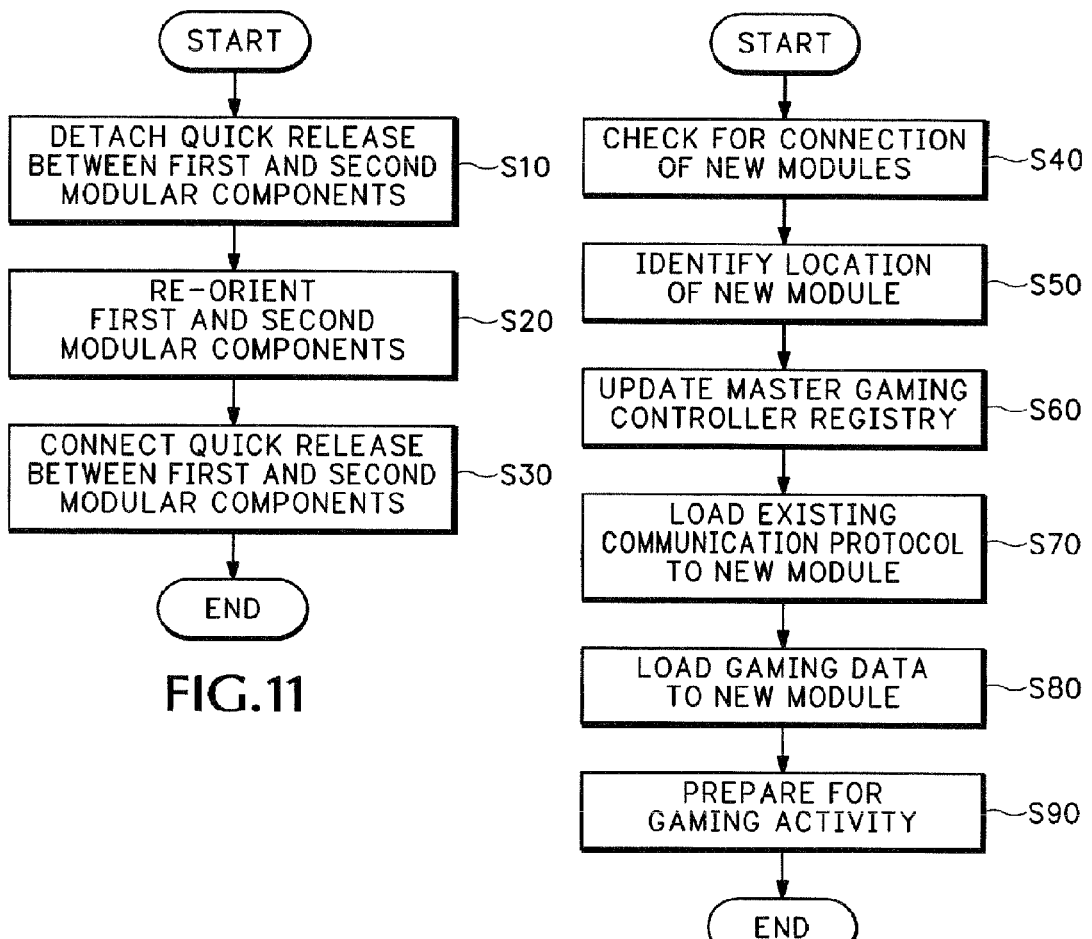
FIG. 11 illustrates a flow chart for physically connecting a first modular gaming table component to a second modular gaming table component according to an embodiment of the present invention.
FIG. 12 illustrates a flow chart for dynamically recognizing a modular gaming table component when it is connected to a gaming device according to an embodiment of the present invention.

FIG. 11 illustrates a flow chart for physically reconnecting a first modular gaming table component to a second modular gaming table component according to an embodiment of the present invention.

Referring to FIGS. 11 and 1A-1D, if two modular gaming table components 110 are connected, a mechanical connection means 120, such as one or more universal quick-release latches is detached or disconnected in S10. This may be done, for example, by depressing the quick-release latch mechanism (721 in FIGS. 7A and 7B) such that it rotates about pin 722 and frees itself from the channel of the knock-out opening 723. If a communication connection means 130L requires manipulation to disconnect a left communication means 130L from a right communication means 130R, then the communication means must also be physically disconnected. However, if this step may be omitted in embodiments that use IR or optical communication connection means 130 that do not physically lock into place.

Once the mechanical and communication connection means 120, 130 are detached from each other, the first and/or the second modular gaming table component 110 can be moved in S20. In some embodiments, each of the modular gaming table components 110 may include a moving means (not shown) to move the module, such as wheels or castors. In these embodiments, the moving means may be lockable so that the modular gaming table components 110 remain stationary in a desired location. In other embodiments, stabilization means (not shown) may be lowered to immobilize the modular gaming table components 110 once they have reached a desired location. The modular gaming table components 110 may be rearranged, for example, modify the layout of a gaming floor in a casino. Other reasons may include adding additional gaming stations 150 for tournament or promotional play, routine floor cleaning, or changing a gaming style of play on the gaming device 100 (e.g., from visual poker to virtual blackjack).

After the modular gaming table components 110 have been stationed in a desired location, they may be reconnected by connecting the mechanical connection means 120, such as the quick-release latches between adjacent modular components 110 in S30. This may be done, for example, be depressing the quick-release latch mechanism (721 in FIGS. 7 A and 7B) such that it rotates about pin 722 and locks into the channel of the knock-out opening 723. If a communication connection means 130 requires manipulation to connect a left communication means 130L from a right communication means 130R, then the communication means must also be physically connected. However, if this step may be omitted in embodiments that use IR or optical communication connection means 130 that do not physically lock into place.

FIG. 12 illustrates a flow chart for dynamically recognizing a modular gaming table component when it is connected to a gaming device according to an embodiment of the present invention.

Referring to FIGS. 12 and 1A-ID, the modular gaming table components 110 or the master gaming controller 160 monitors the communication network to detect whether a new modular gaming table component 110 has been connected to the gaming device 100 in S40. In some embodiments, this monitoring process includes an active monitoring routine that periodically sends a signal along the communication path between the modular gaming table components 110 to detect whether a new modular component 110 has been connected to the gaming device 100. In other embodiments, this monitoring process may include a passive monitoring protocol whereby the modular gaming table component 110 that is being added to 5 the gaming device 100 generates a notification signal to alert the other modular components 110 or the master gaming controller 160 of its presence. Further, this detection process may occur dynamically when the new modular component 110 is connected or may not occur until the new modular component 110 is connected to the gaming device 100 and both are powered on. However, it is preferable to have this detection process and the following configuration processes occur dynamically without the need to reboot the gaming device 100.

After a new modular gaming table component 110 has been detected, the connection location of the new modular component 110 is identified in S50. Again, this process may be done by either one or more of the modular components 110 or the master gaming controller 160. The location of the newly connected modular gaming table component 110 may be determined by set address information, signal timing, notification from the modular component 110 of the gaming device 100 that is being connected to, or other similar processes known in the art.

The gaming controller registries of the modular components 110 or the master gaming controller 160 may then be updated with configuration and connection information from the newly added modular gaming table component 110 in S60. This process may allow for community gaming play, such as virtual poker or bonus-linked slot gaming. Additionally, this process may be necessary for server based gaming or player tracking features.

In addition to the updating the gaming controller registries of the gaming device 100, the gaming controller registries of the new modular gaming table component 110 may be updated with the existing communication protocols in S70 so that it can be properly integrated into the gaming device 100. Gaming data may also be loaded onto the new modular gaming table component 110 so that it can participate in community games or promotions in S80. Once the gaming device 100 and new modular gaming table component 110 have been configured to integrate the new modular component 110 into the gaming device 100, the gaming device may prepare for gaming activity by players in S90.

Having described and illustrated the principles of the invention in embodiments thereof, it should be apparent that the invention can be modified in arrangement and detail without departing from such principles. I claim all modifications and variations coming within the spirit and scope of the following claims.

The invention is claimed as follows:

1. A gaming system comprising:
    a first singular modular component integrally formed and having with a first side and an opposing second side, and including a first plurality of gaming station displays between the first side and the opposing second side; and
    a second singular modular component including at least one gaming station display;
    wherein the first and second singular modular components are configured to be physically connected and directly in contact with one another in at least one configuration.

2. The gaming system of claim 1, which includes a mechanical quick release connection configured to physically connect the first singular modular component to the second singular modular component.

3. The gaming system of claim 2, which includes an electrical quick release connection configured to electrically connect the first singular modular component to the second singular modular component.

4. The gaming system of claim 1, which includes an electrical quick release connection configured to electrically connect the first singular modular component to the second singular modular component.

5. The gaming system of claim 1, which includes a community section including a processor and a central display, the first singular modular component configured to be physically connected to the community section, the second singular modular component configured to be physically connected to the community section.

6. The gaming system of claim 5, which includes a first mechanical quick release connection configured to physically connect the first singular modular component to the community section and a second mechanical quick release connection configured to physically connect the second singular modular component to the community section.

7. The gaming system of claim 6, which includes a first electrical quick release connection configured to electrically connect the first singular modular component to the community section and a second electrical quick release connection configured to electrically connect the second singular modular component to the community section.

8. The gaming system of claim 5, which includes a first electrical quick release connection configured to electrically connect the first singular modular component to the community section and a second electrical quick release connection configured to electrically connect the second singular modular component to the community section.

9. The gaming system of claim 1, wherein the first singular modular component and the second singular modular component are configured to be physically connected directly in contact with one another in a plurality of different configurations.

10. The gaming system of claim 1, wherein at least one of the first singular modular component and the second singular modular component includes a credit input device configured to accept a printed bill.

11. The gaming system of claim 1, wherein the first side is slanted with respect to the second opposing side.

12. The gaming system of claim 1, which includes a controller in operative communication with at least one of the first singular modular component and the second singular modular component, the controller configured to: store an electronic registry of singular modular components in electrical communication, and
automatically update the electronic registry in response to detecting a newly electrically communicated singular modular component.

13. A gaming system comprising:
a first singular modular component integrally formed and housing a first plurality of gaming station modules; and
a second singular modular component including at least one gaming station module;
wherein the first and second singular modular components are configured to be physically connected and directly in contact with one another in at least one configuration.

14. The gaming system of claim 13, which includes a mechanical quick release connection configured to physically connect the first singular modular component to the second singular modular component.

15. The gaming system of claim 14, which includes an electrical quick release connection configured to electrically connect the first singular modular component to the second singular modular component.

16. The gaming system of claim 13, which includes an electrical quick release connection configured to electrically connect the first singular modular component to the second singular modular component.

17. The gaming system of claim 13, which includes a community section including a processor and a central display, the first singular modular component configured to be physically connected to the community section, the second singular modular component configured to be physically connected to the community section.

18. The gaming system of claim 13, which includes a first mechanical quick release connection configured to physically connect the first singular modular component to the community section and a second mechanical quick release connection configured to physically connect the second singular modular component to the community section.

19. The gaming system of claim 18, which includes a first electrical quick release connection configured to electrically connect the first singular modular component to the community section and a second electrical quick release connection configured to electrically connect the second singular modular component to the community section.

20. The gaming system of claim 13, wherein the first singular modular component and the second singular modular component are configured to be physically connected directly in contact with one another in a plurality of different configurations.

21. The gaming system of claim 13, wherein at least one of the first singular modular component and the second singular modular component includes a credit input device configured to accept a printed bill.

22. The gaming system of claim 13, which includes a controller in operative communication with at least one of the first singular modular component and the second singular modular component, the controller configured to:
store an electronic registry of singular modular components in electrical communication, and
automatically update the electronic registry in response to detecting a newly electrically communicated singular modular component.

* * * * *